July 22, 1969 R. C. SAVOCA 3,457,410
RADIANCE COMPENSATION MEANS FOR HORIZON SENSORS
Filed Oct. 17, 1966

INVENTOR.
ROBERT C. SAVOCA
BY

United States Patent Office 3,457,410
Patented July 22, 1969

3,457,410
RADIANCE COMPENSATION MEANS FOR HORIZON SENSORS
Robert C. Savoca, New Canaan, Conn., assignor to Barnes Engineering Company, a corporation of Delaware
Filed Oct. 17, 1966, Ser. No. 587,104
Int. Cl. G01t 1/16
U.S. Cl. 250—83.3            5 Claims This invention relates to an improved horizon sensor, and particularly a horizon sensor using infrared radiation in the 14–16μ carbon dioxide radiation band.

Horizon sensors have been used extensively in the past to determine the attitude of vehicles such as satellites, rockets, and the like, by scanning across the Earth's horizons. Essentially what a horizon sensor does is to measure the time delay from horizon crossing to a fixed signal generated in the horizon sensor itself as compared to the time delay from the signal to the opposite horizon crossing where the scan moves from the earth to space. When the attitude of the vehicle is level, about either a roll axis in the case of a roll horizon sensor, or a pitch axis in the case of a pitch horizon sensor, these two time delays are equal. If there is a tilt, then the time delays will not be equal, and with suitable processing circuits, with the details of which the present invention is not concerned, an error signal is developed which can be used for any desired purposes, such as to actuate servo mechanisms to bring the attitude of the vehicle back to the level attitude which is desired.

There are two general types of scanning horizon sensors in which an image of a radiation detector, such as an infrared detector responsive to the 14–16μ carbon dioxide radiation band, is scanned across space, then across the earth, involving two horizon crossings, the first from space to earth and the second from earth back to space. The scan path is usually conical, though the cone may have an angle as great as 180°. In one type of horizon sensor the vehicle does not spin and the horizon sensor incorporates scanning mechanisms such as a rotating prism, mirrors, and the like. In the other type, where the satellite is spin-stabilized, the rotation of the satellite itself determines or produces the conical scan. The portion of the electronic circuits including the improved circuits of the present invention which effect the improved horizon sensor operation, are not concerned with which type of horizon sensor scanning is used. The present invention is particularly desirable with a spinning satellite in synchronous orbit, but the invention is not limited to this particular type of horizon sensor.

In the past a number of problems have arisen. A serious one is the effect of cold clouds below the response threshold of the horizon sensor in the earth's atmosphere, and particularly cold clouds which may be near the horizon where the scan crosses it either in moving from space to earth or from earth to space. Such cold clouds can produce a spurious result, as they may cause the horizon sensor to interpret such a cloud as space, and the actual horizon crossing will appear to be displaced. The effect of cold clouds has been completely eliminated by using, not the earth's true horizon, but the horizon measured with carbon dioxide radiation in the 14–16μ band, which is a horizon that corresponds to a very slightly larger disk than the earth, but inasmuch as the purpose of the horizon sensor is to compare different time delays from a sensor-generated signal to horizon crossings, a slight difference in size of the actual disk is completely immaterial. The use of the infrared radiation only in the 14–16μ band completely eliminates any problems with cold clouds, as this radiation emanates from high altitudes above the clouds and the detector is only sensitive to radiation from this band. This type of horizon sensor is described and claimed in the Kaufman Patent 3,118,063, Jan. 1, 1964. Many, if not most modern horizon sensors are based on this principle.

Another source of error or uncertainty in measurements involves the fact that when a detector image is scanned across a horizon the response is not instaneous because of the finite field of view of the infrared detectors used, and the scan rate. In other words, instead of an ideal profile in the form of a square or rectangular wave, the leading and trailing edges have very definite finite slopes, depending on the field of view of the particular detector used and the scan rate. Final processing circuits for the signal from horizon sensors have been developed which compensate for the above errors, including even the cold cloud problem. However, these processing circuits are quite complicated and quite sophisticated, and therefore represent a further problem which is particularly acute with synchronous-orbit satellites that may have to function for three or more years, that the additional complications increase the possibilities of failures.

The present invention is directed to horizon sensors with amplifying and, to an extent, processing circuits which remove completely the problem of shape of leading and trailing edges with extremely simple circuit configurations and a correspondingly high degree of reliability. When the improvements of the present invention are used with detectors which respond to the 14–16μ carbon dioxide band, only the simplest of processing circuits are required. One might almost call them rudimentary. Thus, the modification using the radiation from the carbon dioxide band presents important advantages when combined with the present invention, and for this reason is preferred. However, the present invention also permits operation at other wavelength bands in the infrared, with extremely simple additional processing circuit developments for elimination to a very large extent of the cold-cloud problem. Therefore where the ultimate in simplicity is not absolutely essential, the present invention can be used to improve the over-all performance of horizon sensors which do not operate on the carbon dioxide band, and for this reason such sensors are included in the broader aspect of this invention, as well as the preferred sensors operating on the carbon dioxide radiation.

It is an advantage of the present invention that it does not require any changes or any complication of the scanning mechanisms, or, as has been touched on above, on the nature of the final signal output processing circuits.

Another very important new result of the improved horizon sensors of the present invention is that they remove completely a problem which was not solved in all cases by the principles of the Kaufman patent utilizing carbon dioxide radiations. It is true that cold clouds no longer present a problem, but even the carbon dioxide radiation is not absolutely constant across each earth scan. It can vary somewhat, and in an extreme case, the profile of the signal from the scan across the earth's disk can show a variation of radiation intensity of as much as 2 to 1. This problem has been appreciated, and can be solved by sophisticated processing circuits, but only at the expense of additional complication and increased system noise, and also a greater possibility of malfunction over long periods of time. The present invention completely solves the problem of a varying carbon dioxide radiation from one part of an earth's scan compared to another, and it does not require any sophisticated additional processing circuits. This is one of the very important practical advantages of the present invention.

Essentially the present invention passes the signal from a scanning detector through a high-pass amplifier which does not respond to slow variations of the order of the time for a single scan. This high-pass amplifier of course involves a certain degree of differentiation, but requires only a relatively small amount of differentiation and does not seriously distort the signals produced, as is the case with differentiating circuits which produce sharp spikes. This is a practical advantage of the present invention, as it permits the simplest kind of circuitry with a high degree of reliability.

The signals from the high-pass amplifier, which responds only to the leading and trailing edges of the earth profile waveshape, are then clamped to fixed voltages and a portion of the signal taken off. Preferably this portion is near to 50% of the peak value of the sloping leading and trailing edges. Since this is a ratio, it is practically completely insensitive to variations in radiance across the earth's scan, even when these can be quite marked, for example the rare extreme case of a 2:1 variation in a carbon dioxide responsive horizon sensor. The reason for the preference of a portion of the signal approaching 50% is that this permits the maximum signal-to-noise ratio, and so increases the reliability and sensitivty of the horizon sensor. Basically the principles of the present invention will operate regardless of the particular proportion of the sloping leading and trailing edges, but if this proportion is too far from 50%, problems may arise with noise either from the peak signal or from the signal as the horizon sensor crossing of the horizon starts. Within the ranges of a practical degree of insensitivity to noise, however, the invention is not in any sense limited to a particular proportion of the signal, or even to a very narrow range near 50%, though, in a more specific aspect, a narrow range approximating 50% has advantages and is preferred. Such a range, for example, might be between 40% and 60%, again the exact figures being of little significance so long as there is still a sufficient degree of insensitivity to noise.

The high-pass amplifier, which is an essential feature of the present invention, will not distinguish against cold clouds, because here the changes in radiance, if an infrared band is chosen which includes the radiance from the clouds, can easily be at a rate of change corresponding to a frequency falling within the high-pass band of the amplifier. This can be compensated for in ultimate processing circuits by suitable gating circuits which turn off response after the initial horizon crossing until the second horizon crossing. Such gating circuits, while they do add complexity, are far less complex and far less sophisticated than the modifications of processing circuits necessary without the present invention.

The invention will be described in greater detail in conjunction with the drawings in which.

The horizon sensor is provided with conventional collecting optics 1 symbolized by a lens. Means are provided for scanning a detector 2 across the earth. As the particular nature of these means are not changed at all by the present invention, they are represented at 3 by a diagrammatic block, and any kind of scanning mechanism, whether due to spinning of a satellite or moving optical parts producing a scan, can be used with the present invention.

The signal from the detector 2 is passed through a high-pass amplifier 4. Again the particular construction of the high-pass amplifier is of no concern to the present invention, and any conventional and reliable amplifier may be used, provided that the amplifier responds only to a frequency sufficiently high so that it responds to the relatively steep slope represented by the horizon crossings and does not respond to the slow changes in signal across a whole scan which can result from different signal strengths as the detector is scanned across the earth.

Figure 1:
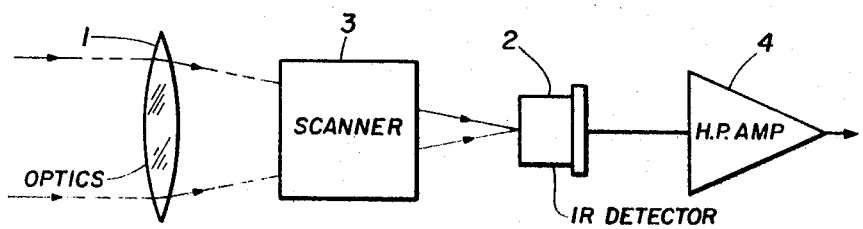
FIG. 1 is a highly conventionalized diagrammatic showing of a horizon sensor.
Figure 2:
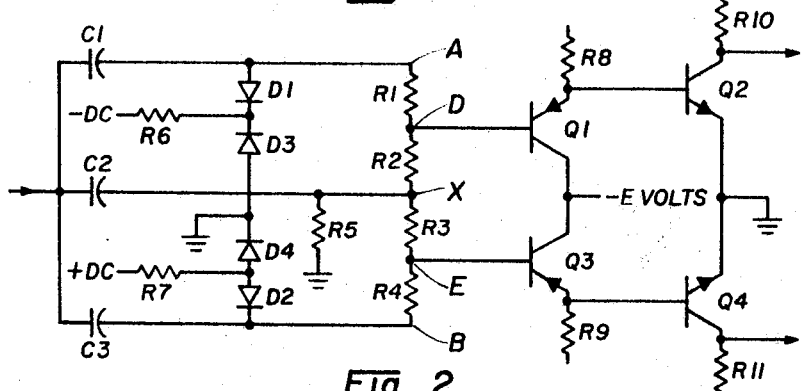
FIG. 2 is a schematic of typical circuits of the present invention which determine a signal correlating to horizon crossings.

The output of the high-pass amplifier 4 is then fed into circuits which clamp the extremes of the signal from the sloping leading and trailing edges of the scan to fixed voltages, and a signal is then produced which is a ratio. FIG. 2 is a typical circuit for carrying out this important function of the present invention, but of course the exact details, including particular component values, may be changed.

It should be noted that the present invention requires the interaction of two electrical circuits in processing the signal from the detector as the scan proceeds. Neither of these circuits alone will perform the functions of the present invention. The two circuits are the high-pass amplifier 4 and a circuit for producing the signals which are a ratio between the peak of each edge and which are shown in a typical form in FIG. 2. The output of the circuits of FIG. 2 are then further processed in processing circuits of conventional design, often including a time delay comparison with a signal produced by the scanning mechanism. Since these circuits are not changed by the present invention and are well known, they are not shown.

Referring to FIG. 2, the signal from the high-pass amplifier is applied to three capacitors C1, C2, and C3. C2 is shown as connected through a resistor R5 to ground, and is also connected to a point X on the ratioing networks which will be described below.

The signals passing through C1 and C3 run to ground through two pairs of diodes connected back-to-back in opposite phase, C1 being connected to the diode pair formed of diodes D1 and D3, and C3 being connected to the diode pair formed of diodes D2 and D4. The junction of the diodes D1 and D3 is connected through resistor R6 to a negative source of D.C. voltage, and in a similar manner the junction of diodes D2 and D4 is connected through R7 to a source of positive D.C. voltage. The circuits shown are balanced by a suitable choice of diodes, and in general when so balanced the numerical magnitude of the D.C. voltages will be the same.

It is also desirable, though not essential, that resistors R6 and R7 be equal or at least not of very widely different values. The effect of the diodes is to clamp the signals from C1 and C3 to zero volts, and this same clamping is noted at points A and B of the signal-dividing network formed of resistors R1, R2, R3, and R4. The center point of the network is at X, as has been described above. For the preferred ratioing, R1 and R2, and R3 and R4 are equal, and therefore their junction points D and E represent 50% of the signals between zero at A and X and zero at B and X.

Point D is connected to the base of a transistor Q1, and similarly point E to the base of a transistor Q2. The exact nature of the transistors is not important, but they should in general be of the same characteristics. The collectors of transistors Q1 and Q3 are connected together, and, as shown in FIG. 2, are connected to a source of negative voltage. The emitters are connected through resistors R8 and R9 to a voltage which is positive with respect to the collectors. The configurations of the transistors Q1 and Q3 are those of emitter followers, but in operation it will be realized that these transistors are usually either conducting or shut off, depending on the voltage conditions at D and E. The emitter of Q1 is connected to the base of a transistor Q2 and the emitter of Q3 correspondingly to the base of a transistor Q4. These transistors are connected in the grounded emitter configuration, the emitters being connected direct to ground as shown, and the collectors having load resistors R10 and R11. These resistors are connected to a positive voltage source.

Figure 3:
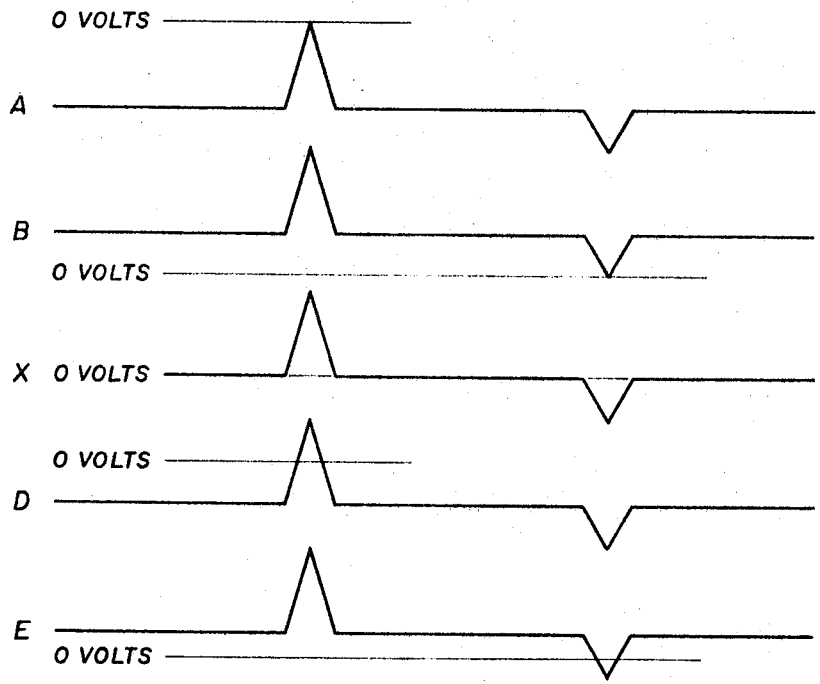
FIG. 3 is a series of waveforms at different parts of the circuits.

FIG. 3 shows waveforms at the points A, B, X, D, and E, and the waveforms represent a much higher peak value of the leading edge, or first horizon crossing from space to earth, than in the case of the trailing edges. This represents the rare extreme situation in the case of a carbon dioxide band horizon sensor where there is a 2:1 difference in the radiation at the point of first horizon crosing and second. Usually the radiance difference across the scan will be less. Signals at the outputs of Q2 and Q4 corresponding to leading and trailing edges are well defined as two pulses of equal amplitude and equal width. These pulses can be considered as perfect rectangular pulses because the time constants of the transistors Q2 and Q4 are so minute compared to the field of view and scan rate of the detector feeding the preamplifier 4 and no slope to the edges of the pulses will be noted. The position of the leading edges of the two pulses just described corresponds to the time from one horizon crossing to the other in the scan. This information therefore locates the horizon crossings accurately for the following conventional processing circuits, regardless of the amplitude of the peak signal in the waveforms at A, B, D, E, and X. In other words, the accurate positioning of the horizontal is unaffected by the profile of the radiance in the scan across the earth. The only limitations, of course, are, as always, that there is sufficient energy to present a decent signal-to-noise ratio, and this is why signal proportionings at points b and E are chosen not too far from 50% to give optimum signal-to-noise ratios.

The slope of the leading and trailing edges shown in FIG. 3 is determined by the nature of the field of view of the scanning detector and scan rate. The exact slope is a matter of indifference to the present invention, but as a typical example, with an immersed thermistor bolometer as a radiation detector, the slope is about 1.4°.

The use of paired diodes D1 and D3, and D2 and D4 in FIG. 2 permits operation from very low signal values from the amplifier 4 and this is a preferred circuit configuration. However, where there is sufficient signal, diodes D3, D4, and resistors R6 and R7 may be omitted. The improved result of the present invention is performed in the same manner but requires a somewhat stronger signal from the amplifier.

The description of the figures has been in connection with a horizon sensor operating in the carbon-dioxide radiation band. If detectors are used which respond to infrared radiations within the ranges in which they can be affected by cold clouds, it is necessary to incorporate simple gating circuits. Such gates can be conventional in design, and are therefore not shown. It is also common to provide horizon sensors with sun gates so that if the sun is encountered in the scan there will be no overloading or detector or circuits. These sun gates are conventional in design, and are not changed in any way by incorporation of the present invention, and are therefore not shown.

I claim:

1. In a horizon sensor provided with scanning means to scan across the earth, including an infrared detector and processing circuits for comparing the time delay between horizon crossings and an internally generated signal to the time delay from the signal to the other horizon crossing, the improvement which comprises, (a) a high-pass amplifier having its input connected to the infrared detector and having a response frequency corresponding to the rate-of-change of signal at a horizon crossing but being too short to respond to gradual signal changes through a scan across the earth, (b) means, receiving signal from the output of said amplifier, for clamping peak signals from horizon crossings to a predetermined level and producing therefrom a fixed ratio of the signals, said means producing a signal corresponding in time to one of the edges of the first horizon crossing and the corresponding edge of the second horizon crossing, whereby the time of horizon crossing is determined regardless of peak radiation at each crossing.

2. An improved horizon sensor according to claim 1 in which the infrared detector is responsive only to the 14–16µ band of carbon dioxide radiation.

3. A horizon sensor according to claim 2 in which the means for producing the signals comprise two capacitors receiving output signal from the amplifier and being connected to a predetermined voltage level through diode systems of reverse polarity whereby signals passing through said capacitors are clamped to said level, and a voltage divider network comprising two pairs of resistors, one pair being connected to the output of the first capacitor and the other to the output of the second, a third capacitor receiving signal from the amplifier output and connected to the center junction of the paired resistors, and transistor switching and amplifying means connected respectively to the junction of the resistors of each pair.

4. A horizon sensor according to claim 3 in which one transistor in emitter follower configuration is connected to each of the junction points between the resistors of each pair, and the emitters of each of said transistors are connected to the bases of amplifying transistors.

5. A horizon sensor according to claim 4 in which the diode systems for clamping output from the capacitors are pairs of diodes back to back of reversed polarity, and the junction between each pair is connected to a D.C. voltage of the same magnitude but of different polarity.

References Cited

UNITED STATES PATENTS

| | | | |
|---|---|---|---|
| 3,050,587 | 8/1962 | Carbrey | 307—259 X |
| 3,118,063 | 1/1964 | Kaufman | 250—83.3 |
| 3,159,751 | 12/1964 | Bogdan et al. | 307—257 X |
| 3,311,747 | 3/1967 | Smith et al. | 250—203 X |

JAMES W. LAWRENCE, Primary Examiner

C. R. CAMPBELL, Assistant Examiner

U.S. Cl. X.R.

250—206; 307—257, 259, 318